United States Patent [19]
LePoire

[11] Patent Number: 5,468,118
[45] Date of Patent: Nov. 21, 1995

[54] APPARATUS FOR STACKING WOOD ROOF TRUSSES

[75] Inventor: Robert A. LePoire, Okemos, Mich.

[73] Assignee: Mitek Holdings, Inc., Wilmington, Del.

[21] Appl. No.: 154,342

[22] Filed: Nov. 17, 1993

[51] Int. Cl.$^6$ .......................... B65G 57/03; B65G 57/16
[52] U.S. Cl. ................... 414/788.9; 414/790.9; 414/793.4
[58] Field of Search .............. 414/790.9, 793.4, 414/788.9, 794.3

[56] References Cited

U.S. PATENT DOCUMENTS

| | | | |
|---|---|---|---|
| 2,434,411 | 1/1948 | Johnson | 414/790.9 |
| 3,079,014 | 2/1963 | Fredriksson | 414/793.4 |
| 3,606,310 | 9/1971 | Larson | 414/794.3 |
| 3,984,010 | 10/1976 | Woloveke et al. | 414/798.5 |

FOREIGN PATENT DOCUMENTS

| | | | |
|---|---|---|---|
| 367437 | 3/1963 | Switzerland | 414/793.4 |
| 850530 | 7/1981 | U.S.S.R. | 414/790.9 |

*Primary Examiner*—Karen B. Merritt
*Attorney, Agent, or Firm*—Senniger, Powers, Leavitt & Roedel

[57] ABSTRACT

Apparatus for stacking individual wood roof trusses horizontally into bundles suitable for banding, the apparatus including a stacking station, a conveyor adapted to convey wood roof trusses individually and in a predetermined horizontal plane to a position adjacent the stacking station. A transporter is provided adjacent the stacking station. The transporter, normally being disposed below the horizontal plane, is raised above the plane to engage a truss and then move the truss laterally off of the conveyor to the stacking station.

16 Claims, 3 Drawing Sheets

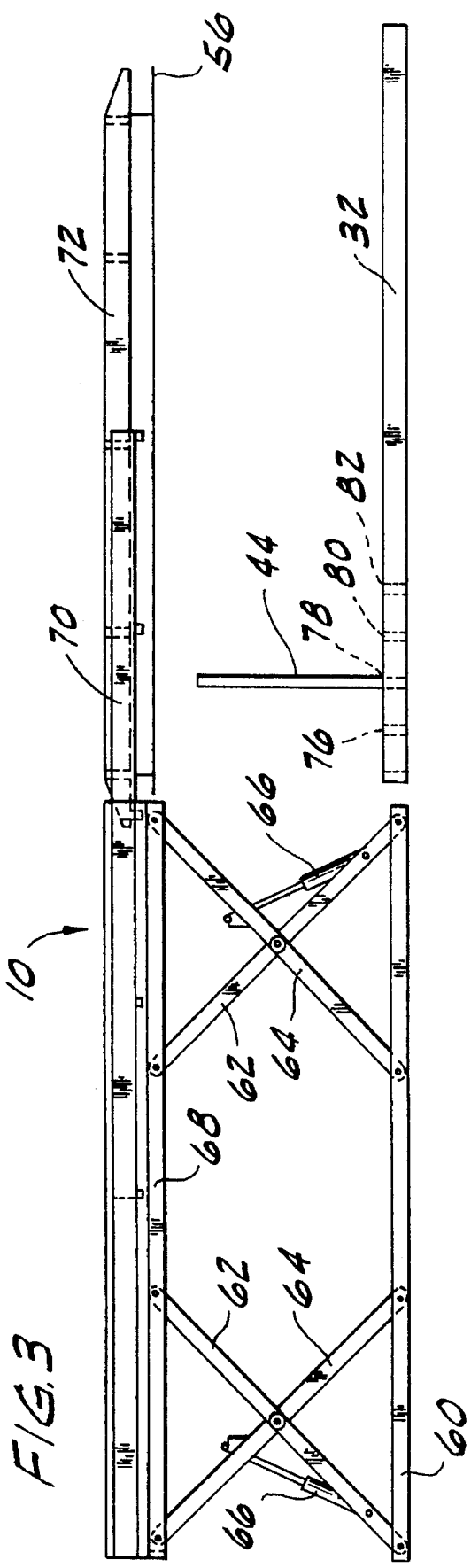
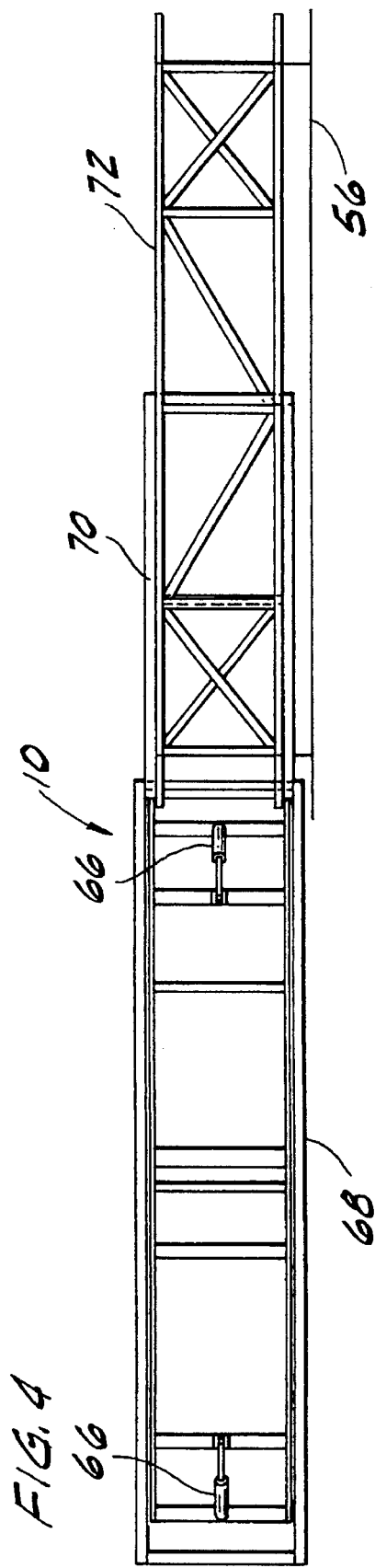
FIG. 3
FIG. 4

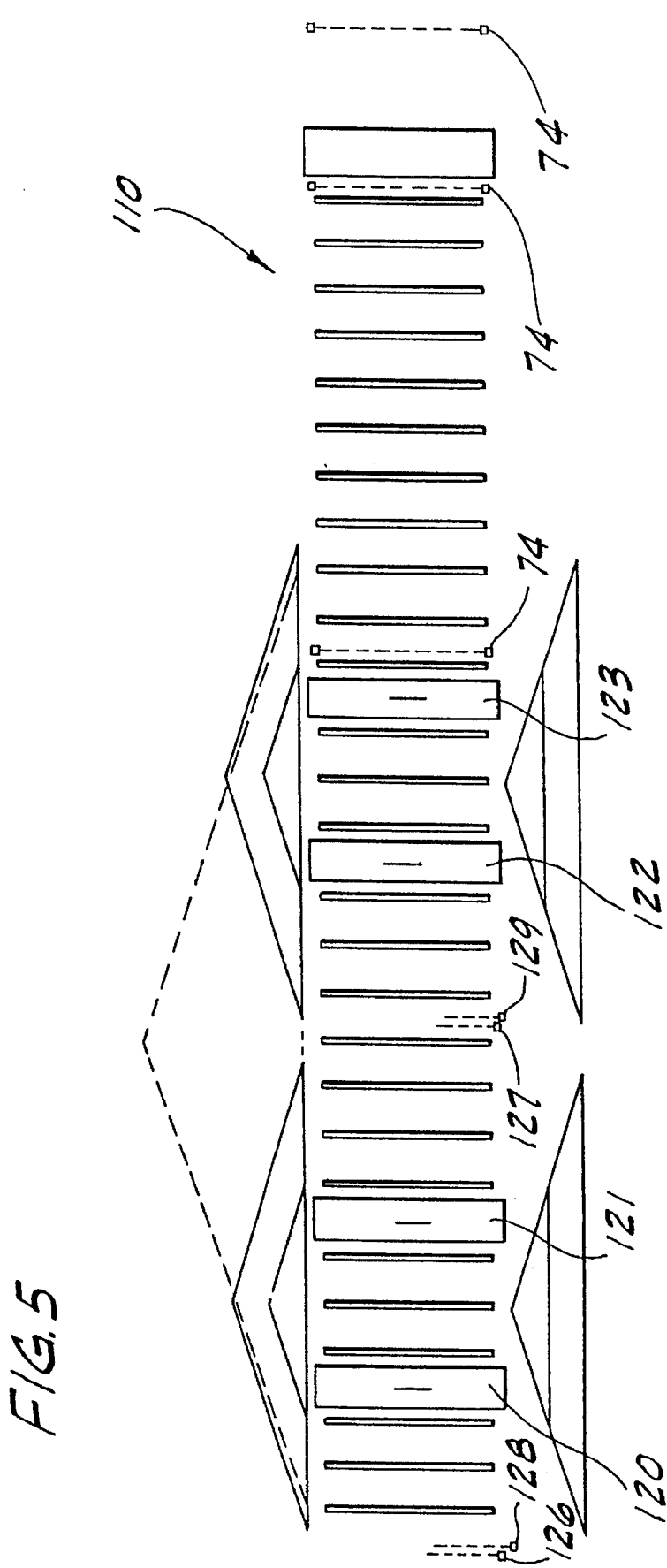

5,468,118

APPARATUS FOR STACKING WOOD ROOF TRUSSES

BRIEF SUMMARY OF THE INVENTION

This invention relates to apparatus for stacking wood roof trusses and, more particularly, to improved apparatus for stacking individual and uniquely profiled wood roof trusses horizontally into bundles suitable for banding either by an automatic system or by an operator interfaced control system. Heretofore, much stacking of wood roof trusses has been labor intensive and has been done manually, usually by two and as many as six people, with consequent high labor costs and the risk of injury to the people involved. Additionally, other prior mechanical truss peak-up or peak-down stackers are limited in the profiles that they are capable of stacking vertically to trusses with defined top and bottom chords. This vertical stacking also necessitates moving the trusses from a vertical position to a horizontal shipping position, usually through the use of large fork lift trucks. Such movement often results in damage to the trusses and is costly to repair.

An object of the present invention is to overcome the aforementioned as well as other disadvantages in prior wood truss stacking apparatus of the indicated character and to provide improved apparatus for stacking wood roof trusses, which apparatus provides significant savings in the cost of labor and also reduces the risk of injury to persons involved in the stacking operation.

Another object of the present invention is to provide improved apparatus for stacking wood roof trusses which minimizes the chances of damage to the roof trusses in the stacking operation.

Another object of the present invention is to provide improved apparatus for stacking wood roof trusses which is not limited to trusses with defined top and bottom chords.

Another object of the present invention is to provide improved apparatus for stacking wood roof trusses, which apparatus may be readily adjusted to accommodate trusses of various configurations and various sizes.

The above as well as other objects and advantages of the present invention will become apparent for the following description, the appended claims and the accompanying drawings.

BRIEF DESCRIPTION OF THE DRAWINGS

FIG. 3 is a side elevational view of the apparatus illustrated in FIG. 1 and showing one transporter in a fully elevated and fully right extended condition with a receiving stand and a backstop pole;

FIG. 4 is a top view of the structure illustrated in FIG. 3; and

FIG. 5 is a schematic top view of another embodiment of the invention incorporating four transporters and four target devices creating four forty foot stacking stations or two up to eighty foot stacking stations.

DETAILED DESCRIPTION

Figure 1:
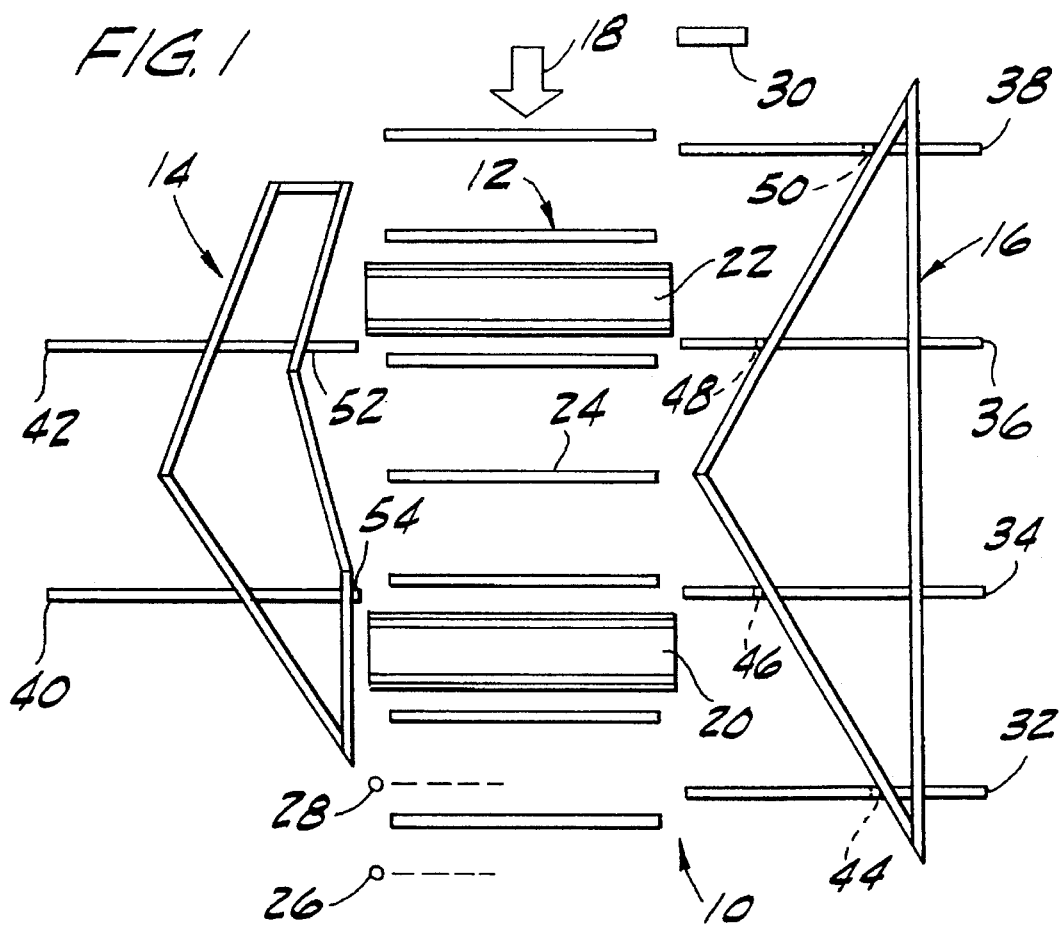
FIG. 1 is a schematic plan view of one embodiment of the invention.

Referring to the drawings, apparatus, generally designated 10, for stacking wood roof trusses and embodying the present invention, is schematically illustrated therein. The apparatus 10 is comprised of a powered roller conveyor 12, and the trusses, such as 14 and 16, which are to be stacked, are moved along the powered roller conveyor in the direction indicated by the arrow 18 in FIG. 1. A pair of transporters 20 and 22 are provided which are nested within the conveyor 12 and below the conveyor rollers 24. The transporters 20 and 22 remain in their home position until such time as a truss interacts with target devices, such as 26 and 28, which may be in the form of electrical switches. The target devices 26 and 28 are of conventional design and are integrated with a conventional switching logic unit 30 adapted to receive and decode electrical signals generated by the target devices 26 and 28. The switching logic unit 30 is of conventional and commercially available construction and is adapted to control the actuation of various piston and cylinder units which are incorporated in the apparatus 10 and which will be described hereinafter in greater detail. The logic unit 30 may be preprogrammed in a conventional manner whereby a truss which interacts with the first target device 26 stacks the truss on the adjacent receiver stands 32, 34, 36 and 38 which form a first stacking station while the second target device 28 is programmed to stack the trusses on the receivers 40 and 42 which form a second stacking station.

Figure 2:
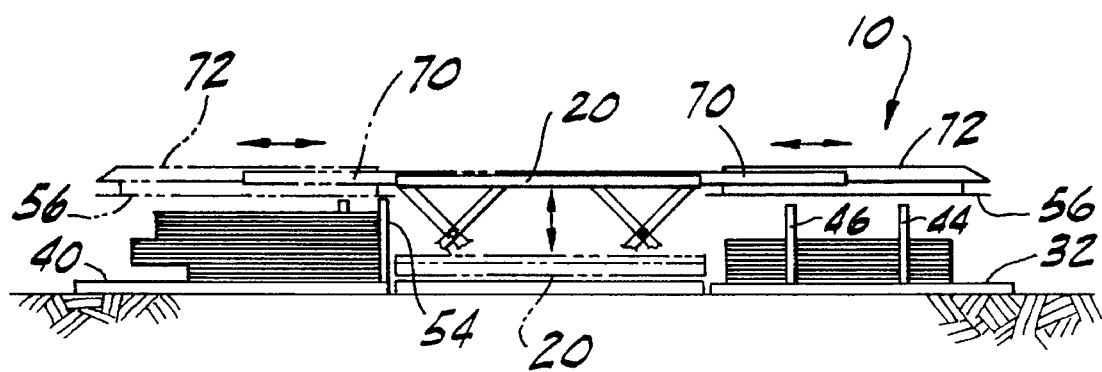
FIG. 2 is an end view of the apparatus illustrated in FIG. 1.

When a stacking cycle is initiated by the interaction of a truss and a target device, the logic unit 30 functions to extend the transporters 20 and 22 to a fully elevated position as shown in FIG. 2. This movement elevates the truss into a plane above the six backstop poles 44, 46, 48, 50, 52 and 54. Based on prior operator selection of the particular target device 26 or 28, the transporters 20 and 22 are extended either to the left or to the right of the conveyor 12 and position the truss above the receiver stands. When the transporters 20 and 22 are fully extended, the transporters are lowered either to their home position or until a flag switch device 56, which may be in the form of a microswitch, acknowledges the location of previously stacked trusses. In the event a transporter is in its completely home lowered position, the transporters simply retract to their central neutral position. However, if a transporter is not in its fully lowered home position, the transporters withdraw to the central neutral position, thus enabling the transporters to return to their lowered home position. When the transporters retract, the truss product is pulled up against the backstop poles. Movement of the transporters past the backstop poles causes the truss to slide off the transporters. The withdrawal action thus aids in aligning the trusses into bandable bundles. It will be understood that the stacking cycle is repeated until the bundle or delivery package is completed.

The embodiment of the invention illustrated in FIG. 5, includes apparatus 110 incorporating four transporters 120, 121, 122 and 123 and four target devices 126, 127, 128 and 129, thereby creating four forty foot stacking stations or two up to eighty foot stations. Otherwise the embodiment of the invention illustrated in FIG. 5 is constructed in the same manner as the embodiment of the invention illustrated in FIGS. 1 through 4.

Mechanically the stacking of the trusses is accomplished by a pair of transporters, one of which is illustrated in FIG. 3. As shown in the drawings, each transporter is comprised of a base 60 and four pairs of scissor arms 62 and 64 which are powered by hydraulic piston and cylinder units 66. The scissor arms 62 and 64 are connected to the base 60 and to the upper frame 68. The upper frame 68 houses the middle transporter bed 70 and the upper transporter bed 72. The transporter beds 70 and 72 move within themselves and within the upper frame 68, as for example, by rolling on structural flanges incorporating tapered and flanged wheels (not shown). The transporter beds retract and extend themselves through the agency of an electromechanical drive which may, for example, incorporate sprockets, chains, and a mechanical braking system of any desired conventional and commercially available design. The flag switch 56 is provided in the form of a hinged device attached to the transporter bed 72, and the hydraulic piston and cylinder units 66 are used to raise and lower the transporter units. Conventional limit switches or other sensing devices are employed as desired to monitor the position of all moving parts so as to enable the programmable logic unit 30 to control the stacking sequence. Photosensing devices, such as 74, are employed to monitor the flow of the trusses along the conveyor to prevent interference with the cycling of the transporters and function to shut down the conveyor system if such interference should occur.

The backstop pole 44, shown inserted in the receiving stand 32, in FIG. 3, is relocatable in a series of pockets such as 76, 78, 80 and 82, provided throughout the length of the receiving stand. Such adjustability in the position of the backstop poles enables the operator to effectively stack an infinite variety of trusses.

While preferred embodiments of the invention have been illustrated and described, it will be understood that various changes and modifications may be made without departing from the spirit of the invention.

What is claimed is:

1. Apparatus for stacking wood roof trusses horizontally into bundles suitable for banding, said apparatus comprising, in combination, a stacking station, conveyor means adapted to convey roof trusses individually and in a horizontal plane along an axis to a position adjacent said stacking station, transporter means positionable in a home position adjacent said stacking station and below said plane, means for raising said transporter means so as to engage a truss and raise the entire truss above said plane, means effective to move the transporter means and raised truss carried by said transporter means perpendicular to said axis off of said conveyor means to a position above said stacking station, means for lowering said transporter means and truss onto said stacking station to deposit the truss at the stacking station and means for returning the transporter means to its home position.

2. The combination as set forth in claim 1, said conveyor means including powered roller means.

3. The combination as set forth in claim 1, and means engagable by a truss and effective to actuate said means for raising said transporter means.

4. The combination as set forth in claim 1, including switching logic means adapted to control the position of said transporter means.

5. The combination as set forth in claim 1, including means effective to control said transporter means to move trusses to either side of said conveyor means.

6. The combination as set forth in claim 1, including means effective to locate the position of previously stacked trusses.

7. The combination as set forth in claim 1, including backstop means effective to cause a truss to slide off of the transporter means at said stacking station.

8. The combination as set forth in claim 1, said apparatus including multiple stacking stations.

9. Apparatus for stacking wood roof trusses horizontally into bundles suitable for banding, said apparatus including a stacking station, powered roller conveyor means adapted to convey roof trusses individually and in a horizontal position along an axis to a location adjacent said stacking station, transporter means located adjacent said stacking station and normally disposed below said conveyor means, means including scissor arm means effective to raise said transporter means so as to engage a truss and raise the same above said conveyor means, and means effective to move the raised truss carried by said transporter means perpendicular to said axis off of said conveyor means to said stacking station.

10. The apparatus as set forth in claim 9, including piston and cylinder means effective to activate said scissor arm means.

11. The apparatus as set forth in claim 10, including means engagable by a truss and effective to actuate said means for raising said transporter means.

12. The apparatus as set forth in claim 11, including switching logic means adapted to control the position of said transporter means.

13. The apparatus as set forth in claim 12, including means effective to control said transporter means to move trusses to either side of said conveyor means.

14. The apparatus as set forth in claim 12, including means effective to locate the position of previously stacked trusses.

15. The apparatus as set forth in claim 12, including backstop means effective to cause a truss to slide off of said transporter means upon retraction thereof.

16. The apparatus as set forth in claim 12, including backstop means effective to cause a truss to slide off of said transporter means upon retraction thereof, and means for adjusting the location of said backstop means.

* * * * *